United States Patent [19]

Scholl et al.

[11] Patent Number: 4,588,807

[45] Date of Patent: May 13, 1986

[54] BENZYLIDENEMALONIC OR VINYLOGOUS BENZYLIDENEMALONIC ACID POLYESTERS, THEIR PREPARATION AND THEIR USE FOR THE UV STABILIZATION OF THERMOPLASTICS

[75] Inventors: Thomas Scholl; Reinhard Preuss, both of Krefeld, Fed. Rep. of Germany; Burkhard Lachmann, Nova Iguacu RJ, Brazil; Hartmüt Löwer, Hilden; Peter R. Müller, Leverkusen, both of Fed. Rep. of Germany

[73] Assignee: Bayer Aktiengesellschaft, Leverkusen, Fed. Rep. of Germany

[21] Appl. No.: 661,760

[22] Filed: Oct. 17, 1984

[30] Foreign Application Priority Data

Oct. 26, 1983 [DE] Fed. Rep. of Germany ....... 3338860
Mar. 17, 1984 [DE] Fed. Rep. of Germany ....... 3409921

[51] Int. Cl.$^4$ ............................................. C08G 63/02
[52] U.S. Cl. .................................... 528/272; 428/200; 428/213; 524/287; 524/288; 524/290; 524/291; 525/441; 525/439; 528/274
[58] Field of Search ................. 525/441, 439; 524/287, 524/288, 290, 291; 528/272, 274; 428/200, 413

[56] References Cited

U.S. PATENT DOCUMENTS 2,859,195 11/1958 Reid et al. ..................... 524/291 X
3,627,725 12/1971 Gilles .............................. 524/291
3,721,704  3/1973 Dexter ......................... 524/291 X
3,943,106  3/1976 Schmidt et al. ............... 525/441 X
4,081,475  3/1978 Spivack ........................ 524/291 X
4,228,067 10/1980 Lachmann et al. ......... 260/45.85 V

FOREIGN PATENT DOCUMENTS 846908 8/1960 United Kingdom .

OTHER PUBLICATIONS

Synthesis of Photocrosslinkable Polyesters by the Knoevenagel Reaction, Journal of Polymer Science: Polymer Chemistry Edition, pp. 1733-1752; vol. 11, No. 7, Jul. 1973, John Wiley & Sons, Inc.

Primary Examiner—Lucille M. Phynes
Attorney, Agent, or Firm—Gene Harsh; Joseph C. Gil; Aron Preis

[57] ABSTRACT

The present invention relates to new benzylidenemalonic or vinylogous benzylidenemalonic acid polyesters containing structural units of the formula (I)

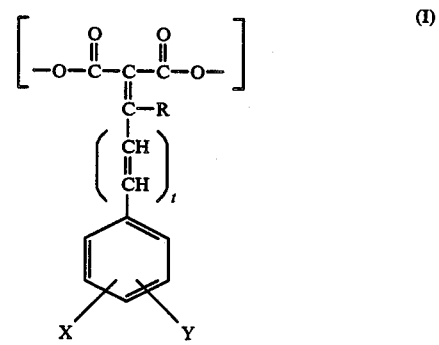

their preparation and their use for the UV stabilization of thermoplastics, preferably thermoplastic, aromatic polycarbonates, thermoplastic, aromatic polyesters or thermoplastic polymethylmethacrylates.

22 Claims, No Drawings

BENZYLIDENEMALONIC OR VINYLOGOUS BENZYLIDENEMALONIC ACID POLYESTERS, THEIR PREPARATION AND THEIR USE FOR THE UV STABILIZATION OF THERMOPLASTICS

The present invention relates to new benzylidenemalonic or vinylogous benzylidenemalonic acid polyesters containing structural units of the formula (I)

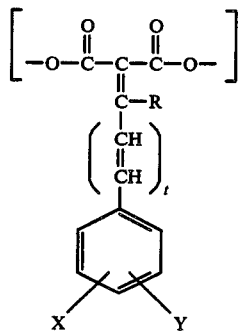

wherein
R=H, $C_1$–$C_4$-alkyl or phenyl and
t=zero, or
R=H and t=1, and
X and Y can be identical or different and are H, OH, methoxy, phenoxy, $C_1$–$C_4$-alkyl, phenyl, Cl or Br, and having molecular weights Mn (measured in a known manner by means of vapour pressure osmosis or gel chromatography) of about 970 to about 9,000, an OH number of 5–115 and a COOH number of 0 to 8.

Preferred polyesters are those of the formula (II)

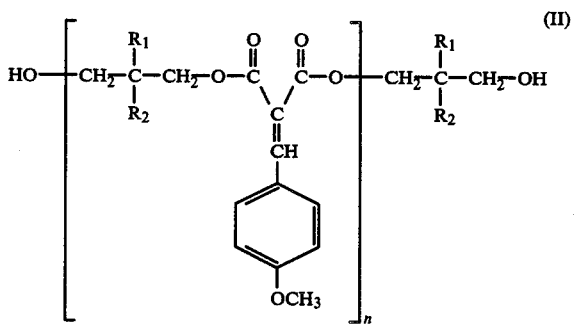

wherein
$R_1$ is methyl or ethyl,
$R_2$ is methyl, ethyl or propyl and
"n" is an integral number of 3 to 30, preferably 10 to 25, which corresponds to an Mn of about 2,000 to 8,450.

The dihydroxy compounds which are suitable for the synthesis of the polyesters according to the invention are aliphatic and/or cycloaliphatic dihydroxy compounds and/or diphenols, and it is possible to employ, as a branching agent, alcohols having a functionality of more than 2, preferably aliphatic triols or aliphatic tetraols in amounts of 0 to 20 mole %, preferably 5 to 15 mole %, relative to moles of dihydroxy compounds.

The new polyesters containing structural units of the formula (I) can be prepared firstly by a Knoevenagel reaction from malonic acid polyesters and the aldehydes or ketones of the formula (III)

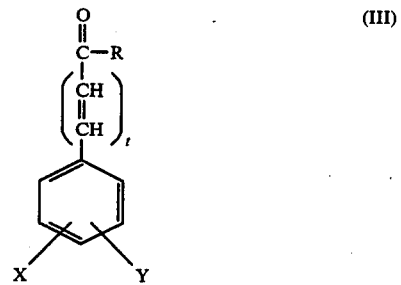

wherein R, t, X and Y have the meaning mentioned for formula (I).

In this reaction it is possible to have recourse to known general directions for the reaction, such as are listed, for example, in Organikum ("Organic Chemistry"), VEB Deutscher Verlag der Wissenschaften, Berlin, 7th edition, in Chapter 7.2.4, pages 444–447.

The preparation of a malonic acid polyester which can be employed as the starting material in this reaction, namely malonic acid ethylene glycol polyester, from diethyl malonate and ethylene glycol is described in Carothers, Aroin, J. Am. Chem. Soc. 51, 2560 (1929).

Other starting polyesters of malonic acid can also be prepared analogously. Acid catalysts, such as are generally known for esterification and trans-esterification reactions, for example p-toluenesulphonic acid, are preferably employed for the preparation of these polyesters. It is preferable to employ, in this reaction, the lowest possible concentration of catalyst, preferably 0.65 to 0.02% by weight, relative to the total of the reactants, in order, on the one hand, to obtain a colourless product and, on the other hand, still to obtain a rapid reaction.

Branching can be induced in the starting polyesters of malonic acid by concomitantly using up to 20 mole %, preferably 5 to 15 mole %, relative to moles of dihydroxy compounds, of alcohols having a functionality of more than 2, preferably aliphatic triols or aliphatic tetraols.

In the Knoevenagel reaction the reactant ratio of the $CH_2$ group in the starting polyester of malonic acid to the

group of compound (III) is between 1:1 and 1:1.2. The catalysts used are typical Knoevenagel catalysts, such as piperidine/glacial acetic acid or ammonium acetate or n-butylamine/glacial acetic acid; examples of suitable solvents are aromatic hydrocarbons, such as benzene, toluene or xylenes. The use of an excess pressure or a vacuum is generally not necessary.

The present invention also relates, therefore, to a process for the preparation of polyesters containing structural units of the formula (I), characterised in that malonic acid polyesters having an Mn of about 500 to 5,000 are reacted with aldehydes or ketones of the formula (III) in the manner of a Knoevenagel reaction at temperatures between about 20° C. and about 150° C., if appropriate with the addition of an inert solvent, in the presence of a Knoevenagel catalyst.

A further process for the preparation of polyesters containing structural units of the formula (I) is the polycondensation of diesters of the formula (Ia)

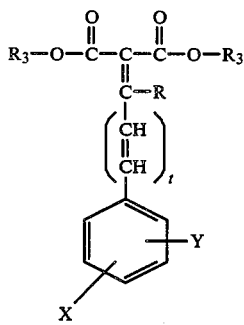

wherein
R, t, X and Y have the meaning mentioned for formula (I) and
$R_3$ is methyl or ethyl
with aliphatic and/or cycloaliphatic dihydroxy compounds and, if desired, alcohols having a functionality of more than 2, preferably aliphatic triols or aliphatic tetraols as branching agents in amounts up to 20 mole %, preferably 5 to 15 mole %, relative to moles of diyhdroxy compounds, at temperatures of 150°–190° C. in the presence of acid or basic trans-esterification catalysts, such as, for example, tetrabutyl orthotitanate or potassium tert.-butylate, under nitrogen.

The present invention also relates, therefore, to a process for the preparation of polyesters containing structural units of the formula (I), characterised in that diesters of the formula (Ia) are reacted in a known manner with aliphatic and/or cycloaliphatic diols, and, if desired, with up to 20 mole %, preferably 5 to 15 mole %, relative to moles of diols, of alcohols having a functionality higher than 2, preferably aliphatic triols or aliphatic tetraols, at temperatures of 150° C. to 190° C. in the presence of an acid or basic trans-esterification catalyst, alcohol being removed by distillation.

The reaction time in the first preparation variant is between about 5 and 10 hours; in the second reaction variant the reaction time is about the same. The isolation and purification of the polyesters according to the invention is effected in a known manner, for example by washing with water and precipitation with methanol.

The preparation process mentioned first is preferred, because it results in products of higher molecular weight which are also characterised, in addition, by a markedly lower iodine colour number.

The polyesters according to the invention are suitable for use as UV stabilisers for thermoplastics, preferably for thermoplastic, aromatic polycarbonates, thermoplastic, aromatic polyesters and thermoplastic poly-$C_1$-$C_4$-alkylmethacrylates.

The present invention also relates, therefore, to the use of the polyesters according to the invention containing structural units of the formula (I) for the UV stabilisation of thermoplastics, preferable thermoplastic, aromatic polycarbonates, thermoplastic, aromatic polyesters or thermoplastic poly-$C_1$-$C_4$-alkylmethacrylates, preferably in amounts of 0.1 to 1% by weight, relative to the weight of thermoplastic.

The incorporation of the polymeric UV absorbers to be used in accordance with the invention, containing structural units of the formula (I), into the thermoplastics is effected by known techniques, for example by adding the polymeric UV absorber in undiluted form to the polymer melt of the thermoplastic or by applying polymeric UV absorber to the solid plastic (granules) by spinning and subsequently extruding the mixture at the melting temperature or by preparing a combination of plastics having a high content of UV absorbers (master batch) and subsequently mixing these concentrates with further plastic.

The present invention also relates, therefore, to a process for the UV stabilisation of thermoplastics, preferable thermoplastic, aromatic polycarbonates, thermoplastic, aromatic polyesters or thermoplastic poly-$C_1$-$C_4$-alkylmethacrylates, which is characterised in that the thermoplastics are either homogenised without further treatment, at temperatures between 250° C. and 320° C., in a known manner with the polymeric UV absorbers, according to the invention, containing structural units of the formula (I), in amounts suitable for UV stabilisation, preferably in amounts of 0.1 to 1% by weight, relative to the weight of thermoplastic, or the polymeric UV-absorbers are incorporated in the same manner at temperatures between 250° C. and 320° C. via the intermediate stage of a 5 to 10 percent strength by weight concentrate in the same thermoplastic.

The present invention also relates to UV stabilised thermoplastics, preferable thermoplastic, aromatic polycarbonates, thermoplastic, aromatic polyesters or thermoplastic poly-$C_1$-$C_4$-alkylmethacrylates having a content of polyesters, according to the invention, containing structural units of the formula (I), preferably having a content of 0.1 to 1% by weight, relative to the weight of thermoplastic.

Polymeric UV absorbers and their use for the UV stabilisation of plastics, in particular thermoplastic polycarbonates, are known (see DE-OS (German Published Specification) No. 2,231,531 and DE-OS (German Published Specification) No. 2,231,532). However, the polymeric UV absorbers described therein are C—C polymers containing ester side groups, whereas the polyesters of the present invention have the ester bonds in the main chain.

The polymeric UV absorbers according to DE-OS (German Published Specification) No. 231,531 and according to DE-OS (German Published Specification) No. 2,231,532 are resistant to sublimation and exhibit the advantage that the extinction coefficients of the polymers, taking into account the UV absorbing constituent, are always markedly higher than the extinction coefficients of the corresponding monomer mixtures (pages 3 and 4 of DE-OS (German Published Specification) No. 2,231,531). In addition, they also stabilise, for example, polycarbonate moulding materials which have been pigmented with $TiO_2$ without a reduction in molecular weight being observed and without a decline in the mechanical properties being observed (page 2 of DE-OS (German Published Specification) No. 2,231,532).

However, it is a disadvantage in the use of these polymeric UV absorbers that the protective action against UV is lower than that of the corresponding commercially available monomeric UV absorbers, as is shown, for example, by the following comparison of compounds A and B:

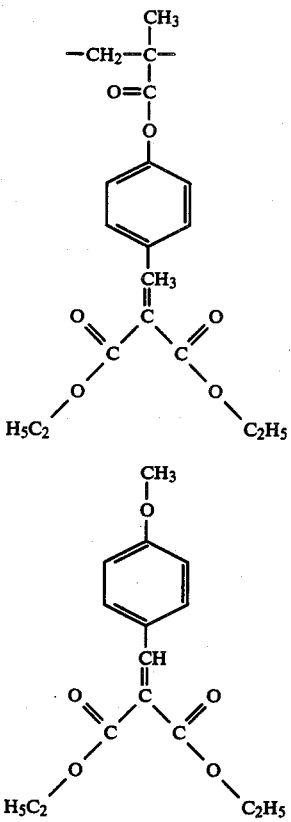

A

B

Transmission values after weathering (1,200 hours) and exposure (1,000 hours) to light of 420 nm ($\lambda_{420}/[\%]$)

| UV absorber | Hg Lamp$\lambda_{420}$(%) | WOM$\lambda_{420}$(%) |
|---|---|---|
| none | 35% | 63% |
| Compound (B)(0.5% by weight) | 53.5% | 72.5% |
| Compound (A)(0.5% by weight) | 38.0% | 67.0% |

When the polymeric UV absorbers according to the invention are used, however, this is not the case.

Examples of malonic acid polyesters which are suitable as starting material for the preparation of the UV absorbers to be employed in accordance with the invention are the products obtained by trans-esterification, in a manner known from the literature, from diethyl malonate and aliphatic diols and/or cycloaliphatic diols and/or diphenols.

The following are examples of suitable aliphatic diols: ethylene glycol, diethylene glycol, tetraethylene glycol, 1,2-propanediol, 1,3-propanediol, 1,2-butanediol, 1,3-butanediol, 2,3-butanediol, 1,4-butanediol, 2,2-dimethyl-1,3-propanediol, 1,5-pentanediol, 1,6-hexanediol, 2,5-hexanediol, 2-methyl-2-propyl-1,3-propanediol, 2,2-diethyl-1,3-propanediol, 2-ethyl-1,3-hexanediol, 1,12-octadecanediol and 1,4-cyclohexanedimethanol.

Examples of cycloaliphatic diols which are suitable for the preparation of the malonic acid polyesters are 1,4-cyclohexanediol or perhydrobisphenol A, while examples of diphenols which are suitable for the preparation of the malonic acid polyesters are 2,2-bis-(4-hydroxyphenyl)-propane (bisphenol A), 1,1-bis-(4-hydroxyphenyl)-cyclohexane, 2,2-bis-(3,5-dichloro-4-hydroxyphenyl)-propane, 4,4'-dihydroxybiphenyl and hydroquinone.

Examples of alcohols having a functionality higher than 2 are trimethylolpropane, glycerol or pentaerythritol Malonic acid polyesters which are preferred for the preparation of the UV absorbers according to the invention are those of the formula (IV)

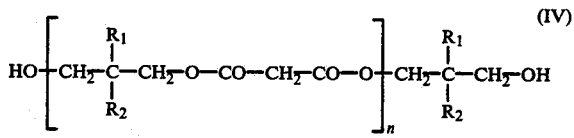

wherein $R_1$, $R_2$ and n have the meaning of formula (II).

Malonic acid polyesters which are very particularly preferred are those of the formula (IV) wherein $R_1=R_2=CH_3$ and "n" is a number from 10 to 25.

The malonic acid polyesters to be employed as starting material for the preparation of the UV-absorbers in accordance with the invention should have average molecular weights Mn (number average) of about 500 to about 5,000 (measured in a known manner by means of vapour pressure osmosis or gel chromatography) they should have OH numbers of 5 to 20 and acid numbers of 2 to 9.

Examples of suitable aldehydes or ketones of the formula (III) are 4-methoxybenzaldehyde, 4-hydroxybenzaldehyde, 4-phenylbenzaldehyde, 4-hydroxy-2-methoxybenzaldehyde, acetophenone, benzophenone and cinnamaldehyde; 4-methoxybenzaldehyde and 4-phenylbenzaldehyde are particularly preferred.

The following are examples of suitable diesters of the formula (Ia): diethyl 4-methoxybenzylidenemalonate, dimethyl 4-methoxybenzylidenemalonate, diethyl 4-hydroxybenzylidenemalonate, dimethyl 4-hydroxybenzylidenemalonate, diethyl 4-phenylbenzylidenemalonate and dimethyl 4-phenylbenzylidenemalonate.

The aliphatic and cycloaliphatic diols and the alcohols having a functionality higher than 2 already mentioned for the preparation of the starting polyesters of malonic acid are also suitable as reactants for the preparation of the polymeric UV absorbers according to the invention from the diesters of the formula (Ia) by the second preparation variant.

2,2-Dimethyl-1,3-propanediol, 2-meth-2-propyl-1,3-propanediol and 2,2-diethyl-1,3-propanediol are preferred dihydroxy compounds for the preparation of the polymeric UV absorbers or the starting polyesters of malonic acid; 2,2-dimethyl-1,3-propanediol is a particularly preferred dihydroxy compound.

The benzylidenemalonic or vinylogous benzylidenemalonic acid polyesters according to the invention containing structural units of the formula (I) are viscous and resin-like products or brittle and glass-like products, depending on their molecular weight. Brittle and glass-like polyesters having softening points of 30° to 70° C. are preferred.

Examples of some of the benzylidenemalonic or vinylogous benzylidenemalonic acid polyesters according to the invention are p-methoxybenzylidenemalonic acid neopentyl glycol polyester (Mn approx. 3,500), p-methoxybenzylidenemalonic acid adipol polyester, p-methylbenzylidenemalonic acid neopentylglycol polyester (Mn approx. 3,500) and p-chlorobenzylidenemalonic acid neopentylglycol polyester.

In addition to the aromatic polycarbonates, aromatic polyesters and thermoplastic poly-$C_1$-$C_4$-alkylmethacrylates already mentioned, examples of thermoplastics which are suitable for UV stabilisation are further thermoplastic, transparent plastics, such as cellulose esters, PVC or special grades of polystyrene.

Thermoplastics which can be stabilised preferentially are thermoplastic, aromatic polycarbonates which can be obtained by reacting diphenols, especially dihydroxydiarylalkanes, with phosgene or diesters of carbonic acid, and, as well as the unsubstituted dihydroxydiarylalkanes, those having aryl radicals which carry methyl groups or halogen atoms in the o-position and/or m-position relative to the hydroxyl group are also suitable. Branched polycarbonates are also suitable. Examples of chain terminators used are monophenols. Examples of branching agents are trisphenols or tetraphenols.

The polycarbonates to be stabilised have mean weight average molecular weights Mw between 10,000 and 100,000, preferably between 20,000 and 40,000, determined by measurement of the relative viscosity in $CH_2Cl_2$ at 25° C. and at a concentration of 0.5 g/100 ml.

Examples of suitable diphenols are hydroquinone, resorcinol, 4,4'-dihydroxybiphenyl, bis-(hydroxyphenyl)alkanes, such as, for example, $C_1$-$C_8$-alkylenebisphenols or $C_2$-$C_8$-alkylidenebisphenols, bis-(hydroxyphenyl)cycloalkanes, such as, for example, $C_5$-$C_{15}$-cycloalkylenebisphenols or $C_5$-$C_{15}$-cycloalkylidenebisphenols, or bis-(hydroxyphenyl) sulphides, ethers, ketones, sulphoxides or sulphones. Also $\alpha,\alpha'$-bis-(hydroxyphenyl)-diisopropylbenzene and the corresponding nuclear-alkylated or nuclear-halogenated compounds. Polycarbonates based on 2,2-bis-(4-hydroxyphenyl)-propane (bisphenol A), 2,2-bis-(4-hydroxy-3,5-dichlorophenyl)-propane (tetrachlorobisphenol A), 2,2-bis-(4-hydroxy-3,5-dibromophenyl)-propane (tetrabromobisphenol A), 2,2-bis-(4-hydroxy-3,5-dimethylphenyl)-propane (tetramethylbisphenol A) and 1,1-bis-(4-hydroxyphenyl)-cyclohexane (bisphenol Z) and also those based on trinuclear bisphenols, such as $\alpha,\alpha'$-bis-(4-hydroxyphenyl)-p-diisopropylbenzene are preferred. Further suitable diphenols and the preparation of the polycarbonates are described, for example, in U.S. Pat. Nos. 3,028,365, 3,062,781 and 3,879,347.

Thermoplastics which can be stabilised preferentially are also thermoplastic, aromatic polyesters based on diphenols and terephthalic and isophthalic acid dichlorides (acid chloride ratio 7:3 to 3:7, preferably 1:1), chain terminators and, if appropriate, branching agents. The compounds mentioned above for the preparation of polycarbonates are used as diphenols, chain terminators and branching agents.

The aromatic polyesters are prepared from the mixtures of acid chlorides, diphenols, chain terminators and, if appropriate, branching agents by the process of phase interface polycondensation. The relative solution viscosity of the aromatic polyesters to be stabilised in accordance with the invention should be between 1.18 and 2.0, preferably between 1.2 and 1.5 (measured in a $CH_2Cl_2$ solution at 25° C. and at a concentration of 0.5 g/100 ml).

Plastics which can be stabilised preferentially are also thermoplastic poly-$C_1$-$C_4$-alkylmethacrylates, that is to say polymers of $C_1$-$C_4$-alkyl methacrylates, for example methyl, ethyl, propyl or butyl methacrylate, preferably methyl or ethyl methacrylate. These are to be understood as meaning both homopolymers and copolymers of these methacrylic acid esters. In addition, up to a maximum of 9.5% by weight of other ethylenically unsaturated, copolymerisable monomers, relative in each case to the total weight of these unsaturated monomers and the methacrylic acid esters, can be copolymerised, so that the $C_1$-$C_4$-alkylmethacrylate polymers to be stabilised in accordance with the invention are composed of 90.5% by weight to 100% by weight of alkyl methacrylate units and of 9.5% by weight to 0% by weight of other ethylenically unsaturated monomer units.

Examples of other ethylenically unsaturated, copolymerisable monomers are (meth)acrylonitrile, ($\alpha$-methyl)styrene, bromostyrene, vinyl acetate, $C_1$-$C_8$-alkyl acrylates, aryl (meth)acrylates, (meth)acrylic acid, ethylene, propylene, N-vinylpyrrolidone, vinylsulphonic acid (salts) or styrenesulphonic acid (salts).

The polymethacrylates which can be preferably stabilised in accordance with the invention are substances soluble in certain organic solvents and thus possess a linear or branched structure.

The polymethacrylates which can be preferably stabilised in accordance with the invention can be prepared by known polymerisation processes, but preferably by free-radical or thermal polymerisation. Suitable polymerisation processes are processes carried out in emulsion, bulk, suspension or dispersion, especially emulsion polymerisation, but preferably bulk polymerisation or solution polymerisation. The molecular weights of the polymethacrylates can be varied within wide ranges by known process-conditioned measures, for example by the use of mercaptans as regulators. Usually the polymethacrylates which can be preferably stabilised in accordance with the invention possess molecular weights (or Staudinger indices, or melt viscosities) of such a kind as to make it rational to carry out their thermoplastic processing by injection moulding or extrusion.

Cellulose esters which can be stabilised in accordance with the invention are obtained in accordance with customary processes by esterifying cellulose with aliphatic monocarboxylic anhydrides, preferably acetic and butyric anhydrides or acetic and propionic anhydrides. The hydrolysis to be carried out in the crude solution is controlled by means of a slight excess of water so that a low hydroxyl content (4 to 25) is obtained. The oxidative bleaching of the cellulose esters isolated from the solution must be carried out in such a way that oxidising agent can no longer be detected in the end product; if necessary, an after-treatment with reducing agents must be carried out.

The OH number is determined by esterifying the free hydroxyl groups of the cellulose ester with acetic anhydride in pyridine; the excess anhydride is reacted with water and back-titrated [Directions: C. J. Mahn, L. B. Genung and R. F. Williams, Analysis of Cellulose Derivatives, Industrial and Engineering Chemistry, Volume 14, No. 12, 935–940 (1942)].

The viscosity of the cellulose esters should be 0.3 to 0.5 poise, measured in the form of a 20% strength solution in acetone. Cellulose esters which can be used preferentially have an acetic acid content of 17 to 23% by weight and a butyric acid content of 45 to 50% by weight in the case of the acetobutyrate, and a propionic acid content of 61–69% by weight and an acetic acid content of 2 to 7% by weight in the case of the acetopropionate. The OH numbers are usually between 4 and 25. The mean weight averages of the molecular weights Mw are between 10,000 and 1,000,000, preferably between 100,000 and 500,000.

PVC grades which can be stabilised in accordance with the invention are emulsion PVC, suspension PVC and bulk PVC. The Fikentscher K-values, measured in cyclohexanone (1% strength solution at 23° C.), are between 50 and 80.

Special transparent grades of polystyrene which can be stabilised in accordance with the invention are homopolymers of styrene or copolymers of styrene which preferably contain acrylonitrile and/or butadiene and/or malonic acid esters, and are obtained at an Mw of 10,000–600,000 from the monomers or mixture of monomers by, for example, suspension polymerisation in the presence of catalysts. (Mw is measured in DMF at c=5 g/liter and 20° C.). (For literature on this see: Beilsteins Handbuch der Organischen Chemie ("Beilstein's Handbook of Organic Chemistry"), fourth edition, third supplement, Volume 5, pages 1163–1169, Springer Verlag 1964, and H. Ohlinger, Polystyrol, 1. Teil, Herstellungsverfahren und Eigenschaften der Produkte ("Polystyrene, Part 1, Preparative Processes and Properties of the Products"), Springer Verlag 1955).

The processing of the thermoplastics containing the incorporated polymeric UV absorbers according to the invention can be carried out by the known methods of extrusion or casting to give a very wide variety of shaped articles, in particular sheeting and panels, including, for example, double-webbed panels as specified in EP-OS (European Published Specification) No. 0 054,856. The extrusion can be carried out with or without the application of a vacuum in customary extruders at temperatures of 250° C. to 320° C., in a manner depending on the nature of the plastic to be extruded. Virtually no evaporation of the UV absorber according to the invention takes place in the course of this.

A particularly advantageous application of the polymeric UV absorbers according to the invention is use in thermoplastic polycarbonate films in concentrations of 1% by weight to 15% by weight, preferably 3% by weight to 7% by weight, relative to the weight of the film, these films being used in a thickness of 10 to 100 μm, preferably 20 to 50 μm, for covering shaped articles made of thermoplastics, for example of the thermoplastic polycarbonates, aromatic polyesters or thermoplastic polymethylmethacrylates mentioned above. Coverings of this type and their application are known (see, for example, DE-OS (German Published Specification) No. 1,694,274 and DE-OS (German Published Specification) No. 2,832,676). Particular advantages are afforded for the co-extrusion of multilayer systems in vacuo, above all in comparison with the use of monomeric benzylidenemalonic acid esters according to German Patent Specification No. 1,087,902 or DE-OS (German Published Specification) No. 2,310,135, which can lead, above all in the case of vacuum extrusion, because of their evaporation, to problems relating to the equipment and the quality of the extruded shaped articles.

The present invention also relates, therefore, to films of thicknesses from 10 to 100 μm, preferably 20 to 50 μm, composed of thermoplastic, aromatic polycarbonates having a content of 1% by weight to 15% by weight, preferably 3% by weight to 7% by weight, of the benzylidenemalonic or vinylogous benzylidenemalonic acid polyesters according to the invention containing structural units of the formula (I), relative to the weight of the film.

The invention also relates to the use of such polycarbonate films for covering shaped articles composed of thermoplastics, particularly using the co-extrusion process.

Examples of shaped articles which are particularly suitable for covering are hollow cavity panels or double-webbed panels according to EP-OS (European Published Specification) No. 0,054,856.

It is known that monomeric compounds of the benzylidenemalonic ester type, for example diethyl 4-phenylbenzylidenemalonate, have a lower light stabilising action than UV absorbers of the benztriazole type, for example 2-(2-hydroxy-3-tert.-butyl-5-sec.-butylphenyl)benzylidenemalonate. Monomeric benzylidenemalonic esters are therefore usually employed in concentrations approx. 50% greater than benztriazoles. The polymeric UV absorbers according to the invention not only exhibit a better stabilising action than the corresponding monomeric light stabilisers, but a light stabilising action is also achieved which is even better than that of benztriazoles which are currently commercially available, for example 2-(2-hydroxy-3-tert.-butyl-5-sec.-butylphenyl)-benztriazole (see Example C.1).

It is also known that monomeric compounds of the benzylidenemalonic ester type, for example diethyl 4-phenylbenzylidenemalonate, produce a certain falling-off in the mechanical properties, for example the notched impact strength, in plastics. Surprisingly, at comparable concentrations the UV absorbers according to the invention exhibit an improved notched impact strength (see Example C.2).

In addition, the polymeric UV absorbers according to the invention are also more stable against extraction by rainwater than monomeric, commercially available light stabilisers, particularly than hydroxyphenylbenztriazoles.

To the thermoplastics, stabilised according to instant invention, can be added other stabilizers, anti-oxydation agents, mould release agents and flame retarding additives which are usual and known for each of the thermoplastics to be modified; examples are phenols, metaldesactivating agents, sterically hindered amines etc.

The thermoplastics, stabilised according to instant invention, are used preferably in areas which are exposed to high light radiation, for example for constructing greenhouses, for electrical lamps, for furniture and for casing of free air installations.

EXAMPLES

A.1. Preparation of a malonic acid polyester from 2,2-dimethyl-1,3-propanediol and diethyl malonate 3,200 g of diethyl malonate and 2,080 g of 2,2-dimethyl-1,3-propanediol (neopentylglycol) are heated at 140°–150° C. in a stirred kettle, so that ethanol distils off. When half the calculated quantity has distilled off, the mixture is heated at 170°–180° C. for 1 hour so that reflux takes place. Ethanol is then distilled off again and a waterpump vacuum is applied. 3,189 g (93%) of highly viscous malonic acid polyester are obtained. Mn 2,800 (determined by vapour pressure osmosis), OH number 24–25 and acid number 2–3.

B.1. Preparation of a benzylidenemalonic acid polyester from the above malonic acid polyester (A.1)

A solution of 903 g of malonic acid neopentylglycol polyester, 714 g of anisaldehyde, 47.1 g of β-alanine and 47.4 g of glacial acetic acid in 2,600 ml of toluene is boiled under a water separator for 12 hours. After filtration and removal of the solvent by distillation, 2 liters of methanol are added and the mixture is stirred under reflux for 1 hour at 100° C. The phases are separated and the polyester is dried for 4 hours at 150° C. under a waterpump vacuum. The polyester prepared in this way has a molecular weight Mn of approx. 4,500 (determined by gel chromatography); OH number 11–13 and acid number <1; softening point 56° C.

B.2. Preparation of a benzylidenemalonic acid polyester from a monomeric benzylidenemalonic acid ester by the polycondensation process A mixture of 55.6 g of diethyl p-methoxybenzylidenemalonate (B), 32 g of trimethyl-1,6-hexanediol and 0.2 g of K tert.-butylate is heated at 160°–190° C. so that ethanol distils off. When the calculated amount of ethanol has been removed, the mixture is allowed to cool. The orange-coloured residue solidifies when cold to give a tough mass. The softening point of the mass is about 55° C.

C 1. Preparation of a stabilised polycarbonate shaped article

Bisphenol A polycarbonate in granular form ($\eta rel=1.310$, measured in 0.5 g/100 ml of CH$_2$—Cl (sic) at 25° C.) is mixed with 0.3% by weight of the 4-methoxybenzylidenemalonic acid neopentyl polyester from Example (B.1) by so-called application by spinning. The granules are then extruded at 300° C. in a twin-shaft extruder to give a ribbon which is chopped up into granules again. Hollow cavity panels are produced from these granules by the customary extrusion process.

Testing the UV stabilising action

Hollow cavity panels 10 mm thick, produced in the manner described above, were subjected to weathering in a Q.U.V. accelerated weathering device ($X_{max.}=313$ nm) for 3,000 hours. For comparison, 10 mm hollow cavity panels made of the same polycarbonate and containing 0.3% of 2-(2-hydroxy-3-tert.-butyl-5-sec.-butylphenyl)-benztriazole, which had also been produced in the manner described above, were tested at the same time. The light transmission factor at 450 nm was determined. The results of the tests are listed in Table 1.

TABLE 1

| Artificial weathering of hollow cavity panels in a Q.U.V. device | | | |
|---|---|---|---|
| 10 mm hollow cavity panels made of polycarbonate and containing | Light transmission at 450 nm | | |
| | Initially | 1,000 hours | 3,000 hours |
| (a) 0.3% of 4-methoxy-benzylidene neopentyl polyester | 81.2% | 77.7% | 74.6% |
| (b) 0.3% of 2-(2-hydroxy-3-tert.-butyl-5-sec.-butylphenyl)-benztriazole | 81.3% | 76.7% | 72.2% |

C.2 Production of a stabilised polycarbonate shaped article

Bisphenol A polycarbonate in granular form ($\eta_{rel}=1.310$, measured in 0.5 g/100 ml of CH$_2$Cl$_2$ at 25° C.) is mixed with 0.3% by weight, 2% by weight and 5% by weight of the 4-methoxybenzylidenemalonic acid neopentyl polyester from Example (B.1) by so-called application by spinning. The granules are then extruded in a twin-shaft extruder at 300° C. to give a ribbon which is chopped up again into granules. Small standard bars are prepared from these granules by the customary injection moulding process. The notched impact strength of these small standard bars is determined as specified in DIN 53,453. The results are listed in Table 2.

Compound (B), namely diethyl 4-methoxybenzylidenemalonate is incorporated analogously as a comparison compound; the results are also included in Table 2.

TABLE 2

Notched impact strength of polycarbonate containing as additive diethyl 4-methoxybenzylidenemalonate (B) and polymeric UV absorber according to Example (B.1), in mJ/mm$^2$

| Concentration | 0.3 | 2 | 5% by weight |
|---|---|---|---|
| UV absorber (B) | 30.1 | 16 | 5.0 |
| UV absorber (B.1) | 40 | 21 | 10.0 |

We claim:

1. A benzylidenemalonic or vinylogous benzylidenemalonic acid polyester containing structural units of the general formula

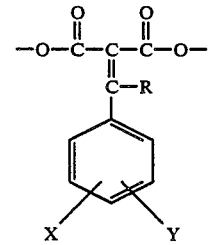

wherein

R denoted hydrogen, C$_1$–C$_4$-alkyl or phenyl and X and Y are identical or different and denote hydrogen, hydroxyl, methoxy, phenoxy, C$_1$–C$_4$-alkyl, phenyl, chlorine or bromine, characterized in having a number average molecular weight of 970 to 9,000, an OH number of 5 to 115 and a COOH number of 0 to 8.

2. A polyester according to claim 1 of the general formula

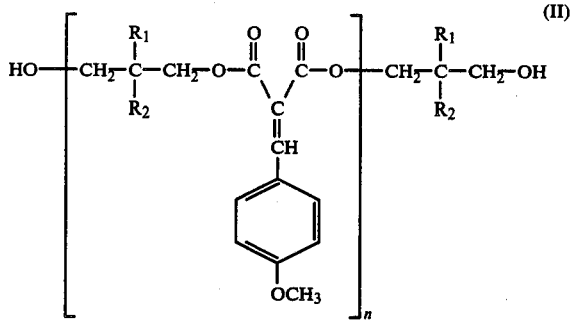

(II)

wherein
R₁ denotes methyl or ethyl,
R₂ denotes methyl or propyl and
n is an integral number of 3 to 30, inclusive.

3. A polyester according to claim 2 in which n is a number of 10 to 25, inclusive.

4. A process for the production of a polyester having a number average molecular weight of 970 to 9,000 an OH number of 5 to 115 and a COOH number of 0 to 8 comprising reacting a malonic acid polyester having a number average molecular weight of 500 to 5,000 in the manner of a Knoevenagel reaction at a temperature between 20° and 150° C. in the presence of a Knoevenagel catalyst, with an aldehyde or ketone of the general formula

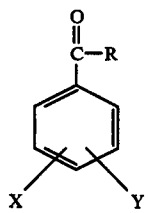

wherein
R denotes hydrogen, C₁–C₄-alkyl or phenyl and X and Y are identical or different and denote hydrogen, hydroxyl, methoxy, phenoxy, C₁–C₄-alkyl, phenyl, chlorine or bromine.

5. A process according to claim 4, in which the catalyst is piperidine/glacial acetic acid, or ammonium acetate or n-butylamine/glacial acetic acid.

6. A process according to claim 4, in which the solvent is an aromatic hydrocarbon.

7. A process according to claim 4, in which the malonic acid polyester is a compound of the general formula

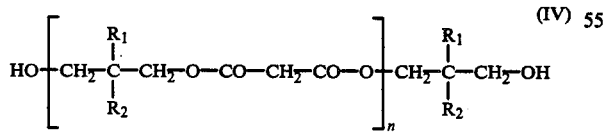

(IV)

in which
R₁ and R₂ both denote methyl and
n is a number from 10 to 25, inclusive.

8. A process according to claim 4, in which the aldehyde of formula (III) is 4-methoxybenzaldehyde or 4-phenylbenzaldehyde.

9. A process according to claim 1, in which the reaction is carried out using 5 to 15 mole %, relative to moles of diol, of the alcohol having a functionality higher than 2.

10. A process according to claim 1 in which the alcohol having a functionality higher than 2 is an aliphatic triol or an aliphatic tetraol.

11. A process according to claim 1, in which the diol is 2,2-dimethyl-1,3-propanediol.

12. A process for the UV stabilisation of thermoplastics materials in which the thermoplastics material is directly homogenised without further treatment at a temperature between 250° C. and 320° C. with a UV-stabilising amount of a polyester according to claim 1.

13. A process for the UV stabilisation of thermoplastics materials, in which a polyester according to claim 1 is incorporated in the thermoplastics material by homogenisation at a temperature between 250° C. and 320° C. via the intermediate stage of the formation of a 5 to 10% strength by weight concentrate of the polyester in the thermoplastics material prior to mixture of this concentrate with further thermoplastics material.

14. A process according to claim 12 or 13 in which the polyester is finally present in an amount of 0.1 to 1% by weight, relative to the weight of the thermoplastics material.

15. UV stabilised thermoplastics material containing a polyester according to claim 12 or 13.

16. A film 10 to 100 μm thick composed of a thermoplastic, aromatic polycarbonate containing 1% by weight to 15% by weight, relative to the weight of the film, of a polyester according to claim 1.

17. The use of the polycarbonate film according to claim 16 for covering a shaped article made of thermoplastics material.

18. A process for the production of a polyester which is characterized in having a number average molecular weight of 970 to 9,000, an OH number of 5 to 115 and a COOH number of 0 to 8, comprising reacting a diester of the general formula

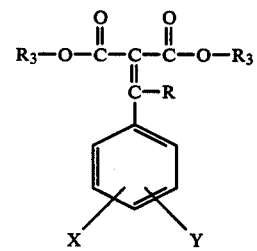

wherein
R denotes hydrogen, C₁–C₄-alkyl or phenyl and X and Y are identical or different and denote hydrogen, hydroxyl, methoxy, phenoxy, C₁–C₄-alkyl, phenyl, chlorine or bromine, and R₃ is methyl or ethyl with an aliphatic and/or cycloaliphatic diol and 0 to 20 mole %, relative to the moles of said diol, of an alcohol having a functionality higher than 2 at a temperature of 150 to 190° C. in the presence of an acid of basic transesterification catalyst, with removal of alcohol by distillation.

19. A polyester prepared by the process of claim 4.

20. A method of using the polyester of claims 1 or 19 in the UV stabilization of thermoplastics.

21. A polyester prepared by the process of claim 18.

22. A method for using the polyester of claim 21 in the UV stabilization of thermoplastics.

* * * * *